Patented Nov. 5, 1940

2,220,508

UNITED STATES PATENT OFFICE 2,220,508

IMPROVING THE WASH - FASTNESS OF SIZES WITH AMINOMETHYLAMIDE DERIVATIVES

Louis H. Bock and Alva L. Houk, Philadelphia, Pa., assignors to Röhm & Haas Company, Philadelphia, Pa.

No Drawing. Application April 11, 1939, Serial No. 267,342

4 Claims. (Cl. 91—70)

This invention relates to improving the wash-fastness of water-dispersible or water-soluble, hydroxyl-containing, sizing materials. In particular, it deals with rendering polyhydroxy, high molecular weight, sizing materials relatively insoluble by reacting them at moderately elevated temperatures with a disubstituted aminomethylamide derivative containing the grouping:

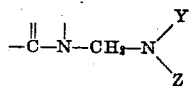

wherein Y and Z represent lower aliphatic groups or groups which jointly with the nitrogen form a heterocyclic ring.

The hydroxyl-containing, high molecular weight, sizing materials, such as starch, cellulose ethers, and polyvinyl alcohol, are useful for impregnating or coating fabrics and yarns to impart stiffness, bulk, or other desired finish. These sizes are economically and easily applied but suffer the disadvantage of removal when the fabric is wet or washed. For many purposes a wash-resistant size would be desirable.

It is an object of this invention to provide a means for rendering hydroxyl-containing, sizing materials less soluble in water so that such finishes on fabrics become resistant to laundering. It is also an object to stiffen fabrics permanently. It is a further object to provide a one-bath process for the fixation of otherwise water-dispersible or water-soluble sizing materials on fibers, yarns, fabrics, straw, paper, and similar materials.

These objects are accomplished by the use of nitrogenous compounds which possess the essential group shown above. The most valuable compounds of this type are represented by the following general formula:

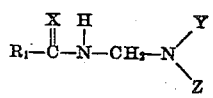

wherein $R_1$ represents an organic radical devoid of free acidic groups, including aliphatic and alicyclic hydrocarbon radicals, amino groups, and imino groups bearing such varied substituents as cyano, alkylene, phenyl, and methylene disubstituted amine groups. X represents oxygen, sulfur, or an imino group, Y and Z represent, when taken separately, lower aliphatic groups or, when taken jointly, members of a heterocyclic ring. It should be noted the hydrogen atom in the above formula may be replaced with a lower alkyl group or with a phenyl group to give compounds which come within the more general structure but which are less readily available.

The groups Y and Z may be any lower aliphatic groups, such as methyl, ethyl, ethanol, isopropyl, allyl, butyl, hexyl, or octyl. The two groups may be the same or they may be different, as capryl and methyl. These two groups may also be joint members of a heterocyclic ring, of which the nitrogen is also a member, as in morpholine, piperidine, piperazine and other rings. It will thus be seen that the—

group is obtainable from practically any non-aromatic, strongly basic, secondary amine.

The nature of $R_1$ may be widely varied so long as it is devoid of free acid groups. The influence of $R_1$ is noticeable in the type of finish produced. Long chains give soft finishes, whereas shorter chains give harder, stiffer finishes. The properties of finishes are also controlled by the amount, type and kind of sizing agent used.

The following are representative compounds which are effective in insolubilizing sizes—

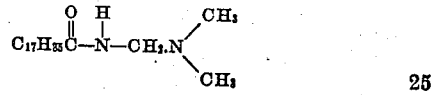

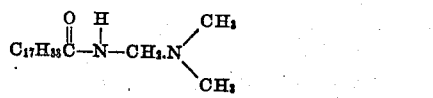

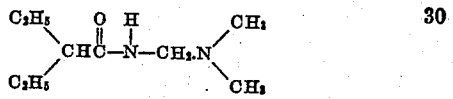

Dimethylaminomethyl naphthenamide

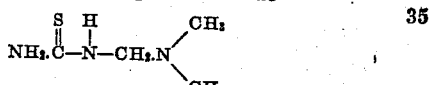

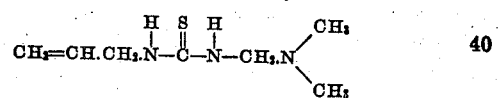

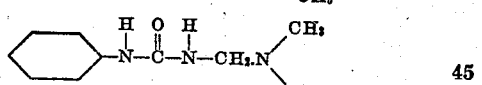

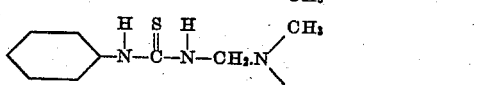

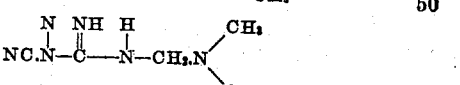

Tris(dimethylaminomethyl) melamine

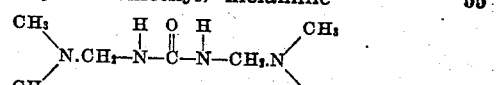

These compounds react at moderately elevated temperatures with polyhydroxy sizing materials to yield relatively insoluble complexes or reaction products. The particular sizing materials which are contemplated in this invention are the cellulose ethers, such as water-soluble methyl or ethyl cellulose and hydroxyethyl cellulose, polyvinyl alcohol, and starch, such as corn, rice, tapioca, sago, wheat or potato starch, flours containing a high percentage of starch, and the modified forms of starch.

In the preferred procedure for the application of sizing materials to textile fabrics, yarns, and the like, a sizing bath is prepared and to this bath is added a compound of the sort described above. Suitable compositions contain about two parts of such a compound to about 1 to 10 parts of starch, polyvinyl alcohol or cellulose ether. When the disubstituted aminomethylamide or aminomethylene imino derivatives are not water-soluble, they may be dispersed directly in the viscous sizing baths or they may be dissolved in an appropriate organic solvent which is then added to the sizing bath, or they may be used in the form of salts of organic or inorganic acids. In some cases it is of value to add a small amount of an acidic or alkaline reagent as a catalyst, such as acetic acid, the ammonium phosphates, ammonium chloride, sodium carbonate or bicarbonate, etc. It will be observed that these are for the most part salts of a strong acid and a weak base, or salts of a weak acid and a strong base, such as frequently are used for buffer solutions.

The sizing bath is used to impregnate or coat yarn or fabric by any of the usual sizing methods, such as dipping or spreading, followed by squeezing with rolls or scraping with a doctor knife. The treated yarn or fabric may then be dried if desired. It is then heated to a temperature sufficiently high to cause the fixing agent and polyhydroxy size to react. Or, drying and reacting may be accomplished in the same step.

The temperature needed to make these sizes wash-resistant depends upon the particular size used and the fixing agent selected. The time of heating required also depends upon these factors as well as the temperature used. In general, temperatures above 100° C. or 212° F. are necessary. At 120° C. fifteen minutes or more may be required to produce the desired degree of insolubility. At higher temperatures shorter times become effective. Heating may be accomplished while the fabric or yarn is passed over heated rollers or through a hot oven, such as a loop drier, closed tenter, or the like.

Variations in procedure are possible. Thus, impregnation with size and with fixing agent may be performed in separate baths. Again, compositions of sizing material and fixing agent may be made and used as a prepared sizing.

After the size has been set by the fixing agent, it is often desirable to wash the treated fabric, yarn, or other material to remove salts, unreacted material, decomposition products from the reaction, etc., but washing is not essential.

The process of insolubilizing sizes or improving the wash-fastness of water-dispersible or water-soluble sizes, as described here, may be applied to yarn, fabric, thread, or fibers of any material which may be treated and heated over 100° C. without undue damage. Particularly contemplated are the sizing of such materials as cotton, linen, paper, straw, jute, hemp, and the various synthetic fibers.

The fixation of sizes is further illustrated by the following examples:

*Example 1.*—Cotton sheeting was coated with an aqueous paste comprised of 10 parts of a 7% solution of hydroxyethyl cellulose and 1 part of a 25% solution of dimethylaminomethyl phenyl thiourea acetate, pH 4.2. It was dried and heated at 130° C. for ½ hour. A very stiff finish was acquired, not softened appreciably by launderings.

*Example 2.*—Cotton lawn was coated with a solution of 1 part of a 25% solution of bis-(dimethylaminomethyl) urea hydrochloride in 10 parts of an 8% potato starch paste. It was dried, heated ½ hour at 130° C., and washed. The cloth had acquired a good permanent stiffness.

*Example 3.*—A rayon fabric was coated with an aqueous mixture comprised of 5 parts of a 7% solution of hydroxyethyl cellulose and 1 part of a 25% solution of dimethylaminomethyl thiourea hydrochloride. It was baked at 125° C. for 30 minutes and washed. A very stiff, wash-fast finish was produced.

*Example 4.*—A coating composition containing 6.7% potato starch and 4.2% dimethylaminomethyl cyanguanidine hydrochloride was coated onto cotton fabric. It was air-dried and heated ½ hour at 130° C. A stiff finish resulted, not appreciably softened by washing.

*Example 5.*—Cotton sheeting was coated with an aqueous paste comprised of 7.25% tapioca starch and 2.25% of the hydrochloride of the product obtained by reacting 1 mol of melamine, 3 mols of formaldehyde, and 3 mols of dimethylamine. It was baked at 130° C. for 20 minutes, and washed. A very stiff, wash-fast finish resulted.

*Example 6.*—Cotton sheeting was coated with an aqueous composition comprising 5 parts of a 7.5% solution of hydroxyethyl cellulose and 1 part of a 25% solution of dimethylaminomethyl phenyl urea hydrochloride. It was dried and ironed 1½ minutes with a medium iron. A very stiff finish resulted, permanent to washing.

*Example 7.*—Cotton sheeting was coated with a solution of 1 part of dimethylaminomethyl stearamide in 20 parts of a 4% solution of water-soluble ethyl cellulose. It was dried, heated 30 minutes at 130° C., and washed. The cloth had permanent fullness.

The amine derivatives herein disclosed as useful for rendering sizings resistant to washing are of particular interest and value because of their effectiveness, and the wide variety of compounds which may be made for the purpose and which permit, by proper choice, production of finishes of many different sorts.

We claim:

1. A process for improving the wash-fastness of water-dispersible, hydroxyl-containing size, which comprises treating textile material with said size and with an aminomethylamide derivative, and subsequently heating said treated material, said aminomethylamide derivative being of the formula—

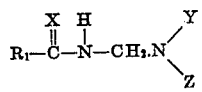

wherein $R_1$ represents an organic radical devoid of free acidic groups selected from the class consisting of aliphatic and alicyclic hydrocarbon radicals, amino groups, and substituted amino groups, X represents a member of the group consisting of oxygen, sulfur and imino groups, and Y and Z represent members of the group consisting of lower aliphatic radicals and groups which jointly with the nitrogen atom form a heterocyclic ring.

2. The process of claim 1 in which the water-dispersible, hydroxyl-containing size is a starch sizing.

3. The process of claim 1 in which the water-dispersible, hydroxyl-containing size is a cellulose ether sizing.

4. The process of claim 1 in which the water-dispersible, hydroxyl-containing size is a polyvinyl alcohol sizing.

LOUIS H. BOCK.
ALVA L. HOUK.